Patented Jan. 3, 1933

1,892,770

UNITED STATES PATENT OFFICE

ALPHONS O. JAEGER, OF MOUNT LEBANON, AND LLOYD C. DANIELS, OF CRAFTON, PENNSYLVANIA, ASSIGNORS TO THE SELDEN COMPANY, OF PITTSBURGH, PENNSYLVANIA, A CORPORATION OF DELAWARE

PURIFICATION OF CRUDE AROMATIC COMPOUNDS

No Drawing.      Application filed October 5, 1929. Serial No. 397,733.

This invention relates to the purification of crude and semirefined aromatic compounds and especially such aromatic hydrocarbons as anthracene.

Crude and semirefined anthracene is usually purified by crystallization or washing with various solvents, and it has also been purified by a selective catalytic combustion of the impurities. When a solvent such as furfural is used which dissolves both carbazole and phenanthrene, a satisfactory purification of anthracene may be obtained, but the cost of the solvent is fairly high. In the first place, large amounts of solvent are necessary since the anthracene forms normally only from one-seventh to one-half of the raw material and the percentage recovery of the anthracene is also limited; the process may require a hot filtration which is troublesome because of some slime formation, and both the labor and equipment charges are high. The resulting anthracene, however, is of good purity. When anthracene is to be used as a raw material for the production of anthraquinone by catalytic vapor phase oxidation, the most serious impurity is phenanthrene, as moderate amounts of carbazole can be burned out during the catalytic oxidation without giving rise to any large amounts of undesirable by-products, whereas phenanthrene in large amounts is troublesome and gives some intermediate oxidation products which contaminate part of the anthraquinone obtained.

According to the present invention the disadvantages of the crystallization method with expensive solvents is avoided, and relatively cheap reagents can be used with great success. Essentially, the process of the present invention consists in fractionally vaporizing the crude anthracene from the molten state at a temperature below its boiling point at atmospheric pressure with the vapors of chlorinated compounds, both aromatic and aliphatic, among which may be mentioned monochlorbenzene, orthodichlorbenzene, chlorinated paraffin hydrocarbons, the chlorinated residue from the chlorine purification of light oil fractions which is a mixture of chlorinated aliphatic, alicyclic and heterocyclic compounds. In some cases chlorinated naphthalenes and higher molecular compounds may be used. Orthodichlorbenzene and the chlorinated by-products from the chlorine purification of light oil are preferable because of their good efficiency and extremely low price.

The vapors of the chlorinated compounds, sometimes superheated in the case of the lower boiling products, are passed through or over the heated and usually molten crude anthracene, an azeotropic mixture being formed with constituents therewith. The result is that the partial pressure of the constituents soluble in the chlorinated compound is decreased whereas the partial pressure of those relatively insoluble in the compound is correspondingly increased. Accordingly, the constituents which are less soluble in the chlorinated compound tend to volatilize, whereas the constituents which are readily soluble tend to remain behind, care of course being taken to keep the temperature within limits so that the constituents which are readily soluble in the chlorinated compound do not boil.

This selective vaporization below the boiling point of the anthracene produces on condensation of the vapors and subsequent filtration a product which contains a large proportion of the anthracene and carbazole but from which most of the phenanthrene has been removed, at least in the case of better grades of anthracene, the reason of course being that phenanthrene is quite soluble in chlorinated compounds whereas anthracene and to a lesser extent carbazole are relatively less soluble. The condensation of the vapors also produces a solution from which anthracene and carbazole crystallize out in good yields and still more of the phenanthrene remains in solution in the solvent as in the ordinary solvent purification. Thus, the preferred method of the present invention accomplishes a double purification with the same amount of solvent. First, there is a selective vaporization which leaves a large proportion of the phenanthrene behind and, second, the same solvent on condensation provides an ordinary recrystallization purification, eliminating, however, the labor and equipment consuming step of hot filtration. It is, of course, possible with higher grade anthracene and where the final product does not require as high purity to condense out the solids from the carrying vapors at the temperature at which the vapors of the chlorinated compound are still uncondensed. The vapors may then be superheated and then recirculated. This method reduces the loss of the chlorinated compound, permits a more or less continuous process when suitable means are taken for continuously discharging the still residue, and also reduces labor, but the product is usually much less pure and in most cases it is preferable to condense all of the vapors from the fractional vaporization and filter as described above. The filtrate is then heated until the chlorinated compound distills off, the vapors of the still with or without superheating being reused to vaporize further quantities of crude anthracene. The still residue which contains phenanthrene and anthracene with some carbazole can be added to the next batch of crude anthracene as it contains nearly as high anthracene content as the original crude.

While it is an advantage that the present invention can be used with chlorinated compounds only, thus permitting the use of a very cheap solvent, it should be understood that the invention is not limited to using chlorinated compounds alone and the vapors of the chlorinated compound or mixtures of chlorinated compounds may be associated with other compounds such as, for example, furfural which exerts a selective solvent action on carbazole, decreasing the amount of carbazole vaporized and also removing most of it from the anthracene during the filtration of the condensed vapors. Of course, other solvents such as solvent naphtha and the like, may be associated with the chlorine compound. It should be understood that the use of furfural vapors is not claimed except in combination with chlorinated solvents but forms part of the subject matter of our copending application Serial No. 397,738 filed October 5, 1929.

Another modification consists in adding a solvent for carbazole, such as furfural or pyridine, to the condensed vapors during crystallization in order to obtain a purer anthracene; in fact any known solvent method may be used at this stage in order to aid in the purification.

As the purified product consists primarily of anthracene and carbazole, amounting in most cases to 85 to 92% of the purified product, it may be subjected to suitable treatment for the recovery of carbazole, for example heating with caustic alkali and distilling off the anthracene, heating with caustic alkali and removing the anthracene by solvents, recrystallizing from furfural or pyridine or other carbazole solvent and other methods. For the oxidation of anthracene in the vapor phase to anthraquinone using efficient stabilized catalysts, carbazole is ordinarily not objectionable in moderate quantities and the purified anthracene may, therefore, be directly used for this purpose. The recovery of carbazole will depend, of course, largely on the market for carbazole, but it should be understood that the present invention includes recovery of carbazole wherever it is economically desirable. Phenanthrene may be recovered from the crude anthracene still residue by the ordinary means wherever there is a demand for it.

The present invention may be used with crude anthracenes of various grades or may be used with semi-purified anthracenes such as those which have been subjected to solvent treatment or to catalytic purification by selective combustion of impurities. Of course, where anthracenes of higher purity are used as a raw material the resulting purified products are also of higher grade.

It is desirable in some cases to pass superheated or saturated vapors of the solvent through molten crude anthracene, but the invention is not limited thereto and it is also possible to mix the solvent with the crude anthracene and heat them together until the solvent boils off. This process, while feasible does not superheat the vapors and except with very high boiling chlorinated compounds results in a less efficient fractional vaporization than the preferred embodiment, but is, of course, included in the scope of the application where the peculiar nature of the crude makes it desirable.

The invention has been described in connection with the purification of crude anthracene, in which process it finds perhaps its most important commercial application. It should be understood, however, that what has been said is equally applicable to other aromatic hydrocarbons such as crude acenaphthene and other solid aromatic hydrocarbons, etc. The invention may also be used in the separation of carbazole from phenanthrene where a carbazole-phenanthrene is obtained, for example from recrystallization processes using furfural or pyridine as solvents. When used on crude phenanthrene the carbazole comes over in high percentage leaving most of the phenanthrene behind.

The fractional vaporization may be effected in a simple batch process as described above, or the molten crude aromatic compound may be either sprayed into ascending vapors of the vaporizing solvent or permitted to flow countercurrent thereto, for example in a baffle tower. These processes require a more complicated equipment, but present the advantage that the process may be made continuous with respect to the crude product, the still residue being continuously drawn off as fresh material is sprayed or flows down the tower. The advantages of continuous processes are thereby made available, and, as has been described above, the second step in the process, namely, the condensation of the purified product, may also be made continuous with regard to the carrier vapor by condensing out at a temperature above the boiling point of the vapor. It should be understood that the process may be made continuous as to either or both steps.

The invention will be described in greater detail in connection with the following specific examples which are merely representative illustrations and which are in no sense intended to limit the invention to the exact details therein set forth.

Example 1

365 parts by weight of crude anthracene of 20% purity containing 73 parts of anthracene is melted in a still, the temperature being maintained between 280 and 320° C. Vapors of orthodichlorbenzene superheated to the temperature of the molten anthracene are passed through it, causing vaporization of the anthracene and the major part of the carbazole, but only of small amounts of phenanthrene, and are then led through a condenser, the condensate cooled to atmospheric temperatures and filtered. The cake from the filtration shows about 63.4% anthracene, the recovery being about 63%. Of the remaining 36.5% about 26% is carbazole and a little over 10% phenanthrene, etc. The filtrate is distilled and the distillation residue contains 23% anthracene, the recovery being about 33% so that the total anthracene recovered is about 96%. As the residue has almost as much anthracene as the original crude, it is added to a fresh batch of crude and the cycle repeated. The vapors of orthodichlorbenzene from the distillation are recirculated directly through the crude anthracene still. The residue in the crude anthracene still contains most of the phenanthrene and a number of tarry constituents, such as pyrene, retene, dead oils, etc. The phenanthrene may be recovered from this residue, if desired, using the ordinary methods.

Example 2

Crude anthracene as described in Example 1 is treated with the chlorinated residue from the chlorine purification of light oil by the process covered in the United States patent of Alphons O. Jaeger, No. 1,741,305, dated December 31, 1929. Purified anthracene of about the same purity is obtained varying slightly with the composition of the chlorinated residue used. Instead of using chlorinated residue, monochlorbenzene may be employed.

Example 3

A crude anthracene of 14.7% purity is treated with orthodichlorbenzene vapors as described in Example 1, the temperature being kept between 310 and 320° C. The cake from filtration shows about 51% anthracene and about 12–13% phenanthrene, the remainder being carbazole. This anthracene can be directly used in the catalytic oxidation to anthraquinone, carbazole being burned out during the process. The recovery is about 45%. The residue from steam distillation of the filtrate contains about 13.6% anthracene with a recovery of 48%, making a total recovery of 94.5%. The still residue, consisting of a major proportion of phenanthrene together with unvaporized anthracene and carbazole and small amounts of pyrene, retene, dead oils, etc., is added to the next batch of crude anthracene.

Example 4

The residue from a solvent purification of crude anthracene containing about 35% carbazole is treated as described in Example 1 with orthodichlorbenzene vapors or monochlorbenzene vapors. The product contains from 55 to 60% carbazole from which purified carbazole can be readily obtained by the usual methods.

What is claimed as new is:

1. A method of purifying solid crude aromatic compounds, which comprises fractionally vaporizing the product from the molten state at a temperature below its boiling point in a carrier gas stream containing vapors of at least one chlorinated organic compound the vaporization being effected by causing the carrier gas stream containing the vapors of the chlorinated compound to contact with the crude aromatic compound.

2. A method of purifying a solid crude aromatic hydrocarbon, which comprises fractionally vaporizing the product from the molten state at a temperature below its boiling point in a carrier gas stream containing vapors of at least one chlorinated organic compound the vaporization being effected by causing the carrier gas stream containing the vapors of the chlorinated compound to contact with the crude aromatic compound.

3. A method of purifying crude anthracene, which comprises fractionally vaporizing the product from the molten state at a temperature below its boiling point in a carrier gas stream containing vapors of at least one chlorinated organic compound the vaporization being effected by causing the carrier gas stream containing the vapors of the chlorinated compound to contact with the crude anthracene.

4. A method of purifying solid crude aromatic compounds, which comprises fractionally vaporizing the product from the molten state at a temperature below its boiling point in a carrier gas stream containing vapors of at least one chlorinated aromatic compound the vaporization being effected by causing the carrier gas stream containing the vapors of the chlorinated compound to contact with the crude aromatic compound.

5. A method of purifying a solid crude aromatic hydrocarbon, which comprises fractionally vaporizing the product from the molten state at a temperature below its boiling point in a carrier gas stream containing vapors of at least one chlorinated aromatic compound the vaporization being effected by causing the carrier gas stream containing the vapors of the chlorinated compound to contact with the crude aromatic compound.

6. A method of purifying crude anthracene, which comprises fractionally vaporizing the product from the molten state at a temperature below its boiling point in a carrier gas stream containing vapors of at least one chlorinated aromatic compound the vaporization being effected by causing the carrier gas stream containing the vapors of the chlorinated compound to contact with the crude anthracene.

7. A method of purifying solid crude aromatic compounds, which comprises fractionally vaporizing the product from the molten state at a temperature below its boiling point in a carrier gas stream containing vapors of orthodichlorbenzene the vaporization being effected by causing the carrier gas stream containing the vapors of orthodichlorbenzene to contact with the crude aromatic compound to be vaporized.

8. A method of purifying a solid crude aromatic hydrocarbon, which comprises fractionally vaporizing the product from the molten state at a temperature below its boiling point in a carrier gas stream containing vapors of orthodichlorbenzene the vaporization being effected by causing the carrier gas stream containing the vapors of orthodichlorbenzene to contact with the crude aromatic compound to be vaporized.

9. A method of purifying crude anthracene, which comprises fractionally vaporizing the product from the molten state at a temperature below its boiling point in a carrier gas stream containing vapors of orthodichlorbenzene the vaporization being effected by causing the carrier gas stream containing the vapors of orthodichlorbenzene to contact with the crude anthracene to be vaporized.

10. A method according to claim 1, in which the vapors from the vaporization are condensed at a temperature at which substantially all of the carrier vapors of the chlorinated hydrocarbon are condensed and the condensate filtered cold whereby a further solvent purification is effected in addition to the purification resulting from the step of fractional vaporization.

11. A method according to claim 2, in which the vapors from the vaporization are condensed at a temperature at which substantially all of the carrier vapors of the chlorinated hydrocarbon are condensed and the condensate filtered cold whereby a further solvent purification is effected in addition to the purification resulting from the step of fractional vaporization.

12. A method according to claim 3, in which the vapors from the vaporization are condensed at a temperature at which substantially all of the carrier vapors of the chlorinated hydrocarbon are condensed and the condensate filtered cold whereby a further solvent purification is effected in addition to the purification resulting from the step of fractional vaporization.

13. A method according to claim 7, in which the vapors from the vaporization are condensed at a temperature at which substantially all of the carrier vapors of the chlorinated hydrocarbon are condensed and the condensate filtered cold whereby a further solvent purification is effected in addition to the purification resulting from the step of fractional vaporization.

14. A method according to claim 8, in which the vapors from the vaporization are condensed at a temperature at which substantially all of the carrier vapors of the chlorinated hydrocarbon are condensed and the condensate filtered cold whereby a further solvent purification is effected in addition to the purification resulting from the step of fractional vaporization.

15. A method according to claim 9, in which the vapors from the vaporization are condensed at a temperature at which substantially all of the carrier vapors of the chlorinated hydrocarbon are condensed and the condensate filtered cold whereby a further solvent purification is effected in addition to the purification resulting from the step of fractional vaporization.

Signed at Pittsburgh, Pennsylvania this 1st day of October, 1929.

ALPHONS O. JAEGER.
LLOYD C. DANIELS.